US 7,365,746 B1

(12) United States Patent
Train

(10) Patent No.: US 7,365,746 B1
(45) Date of Patent: Apr. 29, 2008

(54) SIGNAGE DISPLAY SYSTEM AND PROCESS

(75) Inventor: Russell H. Train, Etobicoke (CA)

(73) Assignee: Mirage Motion Media Inc. (CA)

(*) Notice: Subject to any disclaimer, the term of this patent is extended or adjusted under 35 U.S.C. 154(b) by 573 days.

(21) Appl. No.: 10/837,751

(22) Filed: May 4, 2004

Related U.S. Application Data

(60) Provisional application No. 60/467,584, filed on May 5, 2003.

(51) Int. Cl.
*G06T 15/10* (2006.01)

(52) U.S. Cl. .................. 345/427; 345/619; 345/473; 352/100

(58) Field of Classification Search ............... None
See application file for complete search history.

(56) References Cited

U.S. PATENT DOCUMENTS

| 917,587 | A | | 4/1909 | Good |
| 978,854 | A | | 12/1910 | Czerniewski |
| 3,653,753 | A | | 4/1972 | Mitchell |
| 3,694,062 | A | | 9/1972 | Koenig |
| 3,704,064 | A | | 11/1972 | Sollogoub et al. |
| 3,743,394 | A | | 7/1973 | Meszlenyi |
| 3,951,529 | A | | 4/1976 | Gandia |
| 4,179,198 | A | | 12/1979 | Brachet et al. |
| 4,233,767 | A | | 11/1980 | Hryhorczuk |
| 4,383,742 | A | | 5/1983 | Brachet et al. |
| 4,944,572 | A | | 7/1990 | Young |
| 5,390,436 | A | | 2/1995 | Ashall |
| 5,598,650 | A | | 2/1997 | Brown |
| 6,091,482 | A | * | 7/2000 | Carter et al. .............. 355/79 |
| 6,564,486 | B1 | * | 5/2003 | Spodek et al. ............ 40/453 |

FOREIGN PATENT DOCUMENTS

| CA | 2 298 483 | | 8/2001 |
| DE | 198 06 556 | A1 | 8/1999 |
| DE | 199 43 812 | A1 | 4/2001 |
| GB | 2 230 104 | A | 10/1990 |
| GB | 2 317 985 | A | 4/1998 |
| JP | 2000 221920 | | 8/2000 |
| JP | 2000-221920 | A | 8/2000 |
| WO | WO 96/13822 | | 5/1996 |

(Continued)

*Primary Examiner*—Mark Zimmerman
*Assistant Examiner*—Jwalant Amin
(74) *Attorney, Agent, or Firm*—Katten Muchin Rosenman LLP

(57) ABSTRACT

The invention is a novel display system, for signage and the like. An apparatus and process is provided for displaying a static source image in a manner that it is perceived as an animated sequence of images when viewed by an observer in relative motion to the apparatus. The source image is sliced or fractured to provide a plurality of image fractions of predetermined dimension. The fractions are redistributed in a predetermined sequence to provide an output image, which is placed in a preferably illuminated display apparatus provided with a mask. An observer in relative motion to the display apparatus, sequentially views a predetermined selection of image fractions through the mask, which are perceived by the observer as a changing sequence of images. Applying the concepts of persistence of vision, the observer perceives the reconstructed imagery as live action animation, a traveling singular image or a series of static images, or changing image sequences, from a plurality of lines of sight.

2 Claims, 9 Drawing Sheets

FOREIGN PATENT DOCUMENTS

| | | |
|---|---|---|
| WO | WO 97/26642 | 7/1997 |
| WO | 00/07059 A1 | 2/2000 |
| WO | WO 01/27908 A1 | 4/2001 |
| WO | WO 02/01544 A2 | 1/2002 |
| WO | WO 03/041038 A1 | 5/2003 |

* cited by examiner

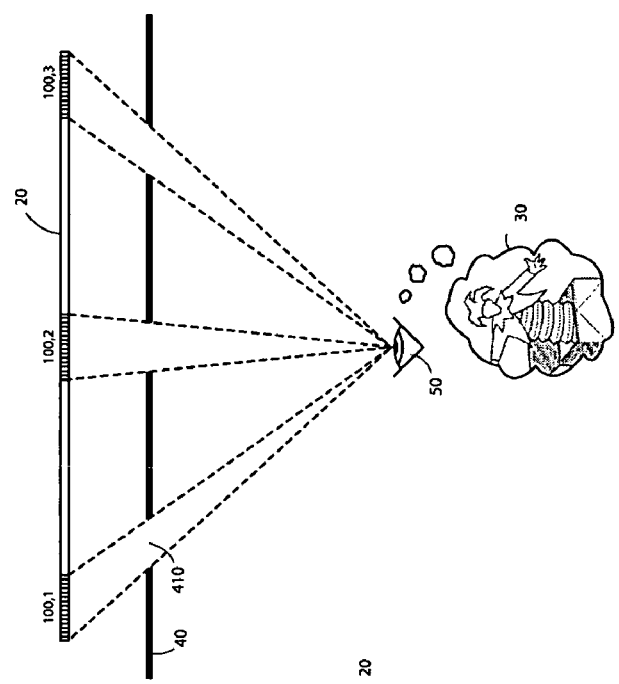
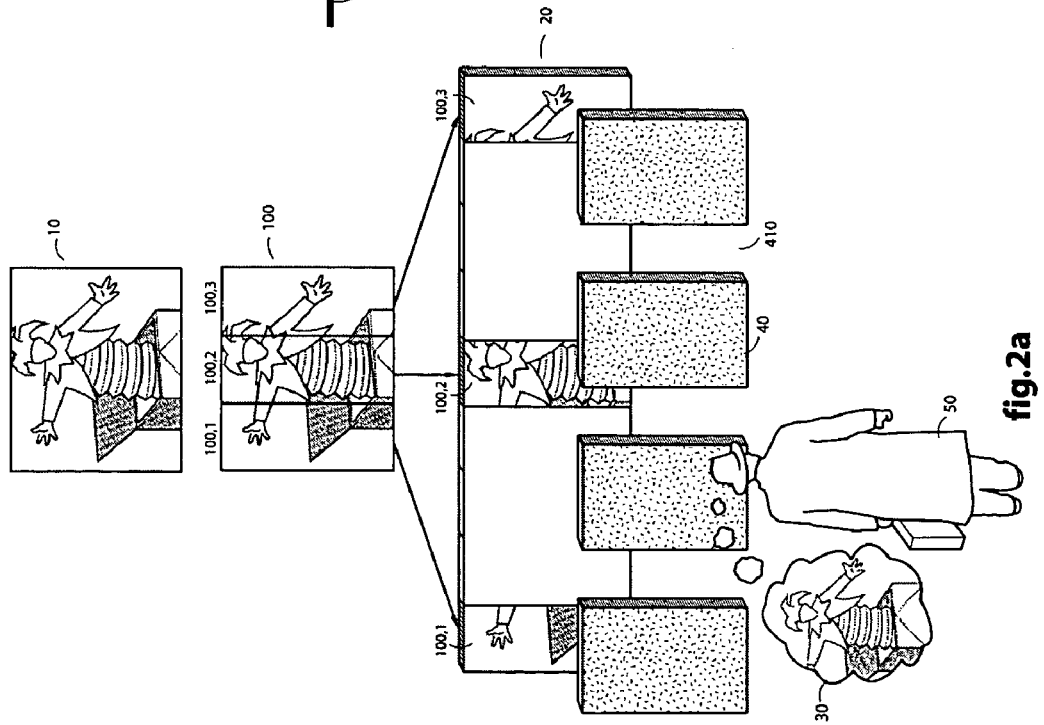

SIGNAGE DISPLAY SYSTEM AND PROCESS

REFERENCE TO RELATED APPLICATIONS

The Applicant claims priority benefit under Title 35, United States Code of U.S. of Provisional Application Ser. No. 60/467,584 filed May 5, 2003 and entitled "SIGNAGE DISPLAY SYSTEM AND PROCESS".

The entire subject matter of U.S. Provisional Application Ser. No. 60/371,424 filed Apr. 11, 2002 and entitled "ANIMATION DISPLAY SYSTEM" is incorporated by reference. The Applicant claims priority benefit under Title 35. United States Code of U.S. Provisional Application Ser. No. 60/371,424 filed Apr. 11, 2002 and entitled "ANIMATION DISPLAY SYSTEM".

The entire subject matter of U.S. Provisional Application Ser. No. 60/330,962 filed Nov. 5, 2001 and entitled "ANIMATION DISPLAY SYSTEM" is also incorporated by reference. The Applicant claims priority benefit under Title 35, United States Code of U.S. Provisional Application Ser. No. 60/330,962 filed Nov. 5, 2001 and entitled "ANIMATION DISPLAY SYSTEM".

The entire subject matter of the Applicant's co-pending Canadian Patent Application Serial Number 2,298,483 filed Feb. 16, 2000 and entitled "A PASSIVE IMAGE STABILIZER AND ANIMATION DISPLAY SYSTEM" is also incorporated by reference.

The entire subject mater of the Applicant's co-pending PCT Application Number PCT/CA02/01246 filed Aug. 15, 2002 and entitled "ANIMATION DISPLAY PROCESS AND ASSEMBLY" is incorporated by reference. The Applicant claims priority benefit under Title 35, United States Code of United States of PCT Application Number PCT/CA02/01246 filed Aug. 15, 2002 and entitled "ANIMATION DISPLAY PROCESS AND ASSEMBLY".

FIELD OF THE INVENTION

This invention relates to a process and apparatus for providing an image display, wherein a static image is perceived as an animated sequence of images when viewed by an observer in relative motion. The apparatus has applicability, for example, as a signage display unit for viewing by an observer on pedestrian walkways, moving sidewalks, escalators, elevators, subways, vehicular tunnels, theme park rides and the like.

BACKGROUND OF THE INVENTION

It is known by persons skilled in the art that the display of an animation sequence may be produced in motion pictures and the like by projecting and illuminating in an intermittent, sequential manner a plurality of discrete images. Conversely, a stationary image sequence may be provided wherein the observer is in relative motion. In both instances, the principles of the phenomenon of "persistence of vision" create an effect of animation.

The general concept of having the observer move, while the images remain static has been applied in several prior instances, with varying degrees of success. In order to create a condition where the principles of persistence of vision can be applied, all prior art forms have applied some form of intermittent lighting. Most of the prior efforts to improve image quality have focussed primarily on attempts to refine complex and expensive systems of stroboscopic light sources in order to apply these principles.

Mechanical illumination triggering devices have inherent mechanical wear problems because of the high triggering rates and thus do not provide a practical solution to the problem. In addition to issues associated with maintenance and trouble free operation of mechanical parts there is a secondary and more pronounced issue, the requirement of reliable and timely triggering of image illumination. In order that the observer clearly see the image, each successive image must be illuminated at exactly the same position relative to the observer. If this process is not precise, the integration of the images will seem blurred.

In most recent inventions, the use of a stroboscopic light sources appear to have been the predominant approach to satisfying the requirement for an intermittent light source. Earlier inventions however, did provide a simpler solution to the problem.

Joseph Antoine Ferdinand Plateau invented the Phenakistiscope (a.k.a. Fantoscope) in 1932. It is basically a disc fixed at its center so that it can spin freely. Around the edges are regularly spaced slits, and in conjunction with each slit is an image drawn in a sequential stage of movement.

The German inventor Stampfer developed the Phenakistiscope separately, but at the same time; he dubbed it the Stroboscope. Many other versions and refinements followed, including a model designed by Stampfer with two fixed discs, one with a series of images, and the other with an equal number of slits or apertures centered in front of each image. Both disks rotated about a horizontal axis and a random distance between the two discs separated the image in the aperture.

In 1834, William George Horner invented the Zoe/trope, an adaptation of the Stroboscope, where the axis of image rotation was transferred from a horizontal to vertical, thereby providing a substantially horizontal direction of relative image movement, while still viewed in a substantially vertical plane. A distance equal to the random diameter of the cylinder separated the image and apertures.

Unlike stroboscopic systems, both the Stroboscope and the Zoetrope employed a consistent and constant light source. In order to provide an intermittent view, an opaque plane with a series of equally spaced vertical slits or apertures were placed between the viewer and the constantly illuminated image.

To perceive an entire image through the narrow width of the aperture, both devices rely on the principles of parallax, which in turn applies the geometry and properties of the isosceles triangles. In essence, as an image proceeds into view, a longitudinal scan of the image is provided to the viewer which progress across the width of the image. The same properties apply when the device is constructed in a linear context where, the images and apertures are arranged in a vertical plane similar to the Stroboscope, while advancing the images and apertures along a horizontal plane similarly to a circular Zoetrope. This, in itself, is not a novel thought but offers a more practical arrangement where the viewer is considered to be the object in a state of relative motion.

Use of a linear arrangement of a Stroboscope, to effect persistence of vision, avoids the mechanical triggering issues and is therefore preferable to the use of a stroboscopic light source.

The widespread commercial application of a practical animation display system, based on the concepts of linear Stroboscope or Zoetrope, suitable for most environments where the viewer is in motion, would desirably first address the number of issues of commercial importance: the elimination of multiple image frames being revealed simultaneously, the ability to affect the range of possible viewing angles, the ability to adjust inappropriate frame rates particularly under conditions of relatively slow movement and the ability to adjust inappropriate image aspect ratios.

It is therefore an object of the present invention to address at least some of these drawbacks.

SUMMARY OF THE INVENTION

It is an aspect of the invention to provide a process and/or apparatus for treating a plurality of still images for use in providing an animated display comprising:
 (a) providing a plurality of source image frames, wherein each frame has an x-axis and a y-axis;
 (b) fracturing of each said source image frames along said x-axis to provide a plurality of image fractions of a predetermined dimension;
 (c) distributing said image fractions of each source image frame in a predetermined sequence along the x-axis to provide an output image.

It is an aspect of this invention to provide for the fracturing of static images such that when viewing the fractured images through a mask, and at a particular distance, the images appear substantially whole and when provided with relative motion between the invention and the viewer, a plurality of fractured images is presented such that the viewer perceives an animated display.

It is a further aspect of the invention to provide an animated display that requires for its operation only a light source (including natural light), and relative motion between the invention and the viewer.

It is a further aspect of this invention to provide an animated display where the relative velocity between the invention and the viewer is not constrained.

These and other similar aspects and/or objects are realized in an embodiment of the invention comprising of a plurality of fractured images arranged in a particular order, a mask that includes substantially opaque sections and apertures, and a light source (including natural light) which illuminates the display either from the front, behind, or sides.

Further aspects, objects and advantages of the invention will become apparent from consideration of the drawings and descriptions thereof.

BRIEF DESCRIPTION OF DRAWINGS

In order that the invention may be better understood, preferred embodiments will now be described by way of example only with reference to the accompanying drawings wherein:

FIG. 2a) is a perspective view of a single image that is fractured then distributed for viewing through a mask creating a reformed image;

FIG. 2b) is a schematic top view of a single image that is fractured then distributed for viewing through a mask creating a reformed image;

DESCRIPTION OF PREFERRED EMBODIMENTS

The purpose of the invention is to present an animated display without the need for the following: electronics (other than that required for a light source, if needed); moving parts within the apparatus; any kind of stroboscopic lighting; special apparatus to be worn or held by the viewer or mounted on the viewer's vehicle. The benefit is to provide a self-contained animated display in any situation where there is illumination (or the animated display can be self-illuminated) and there is relative movement between the animated display and the viewer and the distance between the viewer and the animated display is generally known.

Other attempts to accomplish this have had drawbacks, such as: a minimum relative speed of the viewer or of the apparatus must be maintained; motion is required to see an image at all; there is blurring and distortions of the image due to the motion; or the size of the apparatus is inappropriate for commercial use. This invention resolves these issues.

To provide relative motion, either the viewer or the invention can be in motion. For example, the viewer might walk past the display apparatus or view it from a moving vehicle, or the apparatus could be mounted on a vehicle or somehow otherwise made to move. If the apparatus is substantially circular, it could rotate on a horizontal axis thereby presenting animation to viewers on all sides. The above examples describe horizontal movement. Other directions are possible. Examples of these alternative embodiments are viewers on escalators (diagonal movement), viewers on elevators (vertical movement) or a circular invention rotating on a vertical axis (stationary viewer).

The invention involves primarily of a sequence of fractured static images (hereafter referred to as "output image") being viewed through a mask. The mask includes substantially opaque areas and apertures between these areas. These apertures can either be gaps in the mask (openings such as slits), substantially transparent, or some sort of optical device. Examples of optical devices include, but are not limited to, magnifying lenses, lenticular lenses, fiber optics or prisms. It is preferable that the opaque sections and apertures run in parallel lines and perpendicular to the direction of motion. However, other angles and shapes may also function. Examples of these alternative embodiments include, but are not limited to, straight lines at 45 degree angles to the direction of motion, "S" shapes, or arcs.

The output image must be selectively visible from behind the mask. One alternative embodiment is to illuminate the output image. This illumination might be natural light or artificial light and the output image may be illuminated from the front, rear or sides.

It is preferable to have the same size and shape for each opaque section and for each aperture in the mask.

Figure 1A:
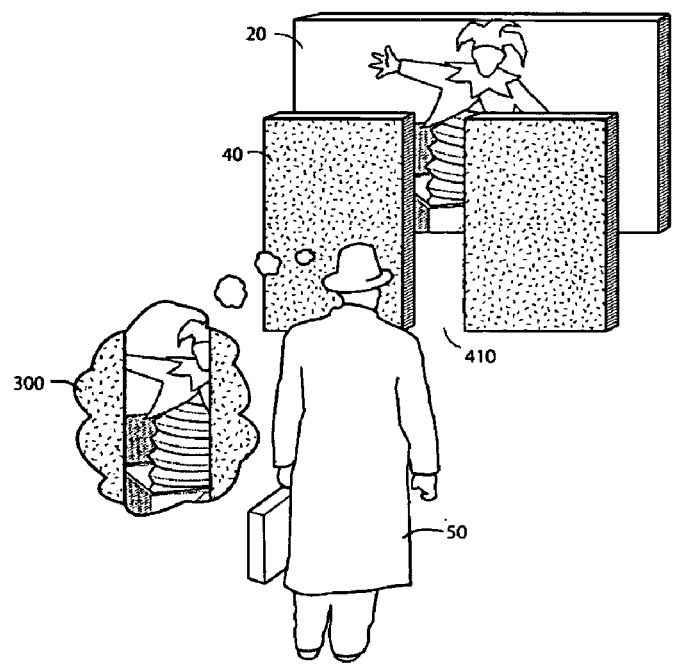
FIG. 1a) is a perspective view of a single image viewed through a mask.

When viewers observe the display apparatus, they only see the predetermined portions of the output image behind the mask that the apertures expose. In a simplified demonstration, FIG. 1a shows how viewing an image 20 through a mask 40, the aperture 410 allows only a selected portion 300 of the image to be exposed.

When viewing the apparatus, the angle at which the viewer's line of sight intersects the display is different for each aperture. This phenomenon is fundamental to the functioning of the invention. The viewer sees a different part of the output image behind the mask due to the variation of these angles.

Figure 1B:
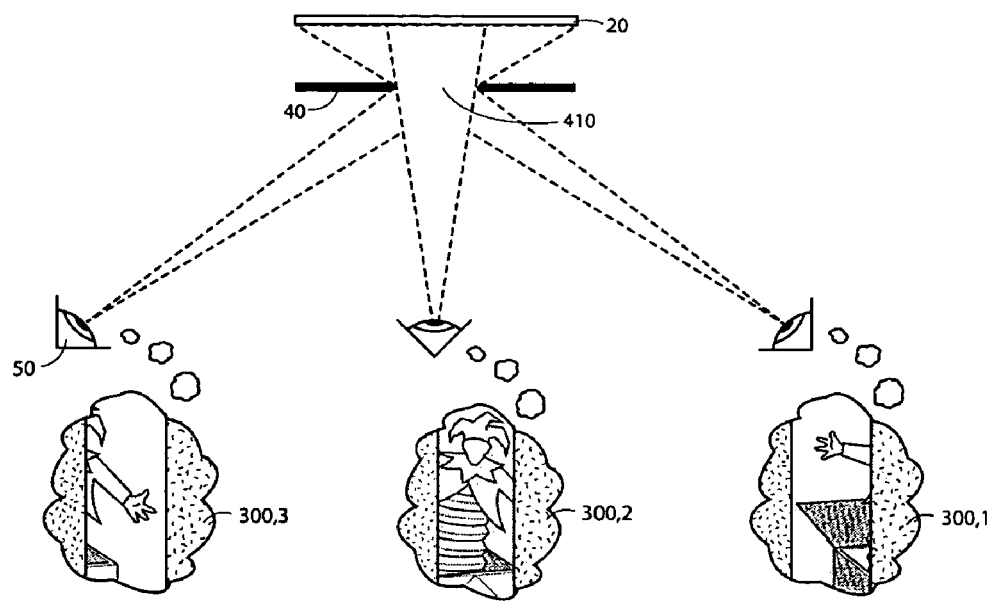
FIG. 1b) is a schematic top view of a single image viewed through a mask from various angles.

In a simplified demonstration, FIG. 1b shows how the viewer 50 sees different portions of the image 20 through the aperture 410 in the mask 40 based on the viewer's position and the angle of the line of sight.

If an image is broken up and distributed in such a way that each portion 300 is exposed by a different aperture, the viewer can then perceive a substantially reassembled image.

FIG. 2a) shows how image 10 is fractured into fractions 100 and then distributed into selected locations creating output image 20. Now when the viewer 50 looks at the invention, the fractions 100 are reformed in the viewer's perception 30 when observed through the aperture 410 in the mask 40.

FIG. 2b) is a top view of FIG. 2a). The angles of the lines of sight cause the viewer 50 to see the specific fractions 100 due to their placement in the output image. The perceived image 30 is substantially whole.

Taking another input image and breaking it up as above, but placing it in a sequential position relative to the next adjacent aperture, will cause the viewer to first see the first image and then the next image when there is movement of the distance of one aperture. By breaking up a series of input images and repeatedly applying the process above, the viewer will perceive an animation of the input images.

The animation to be displayed in the invention should include originally of a series of still images such as sequential images or a series of otherwise unrelated still images (hereafter referred to as "input image"). The source of these input images might be, but are not limited to, motion picture films, videos, still photographic images or computer and traditional animation and graphics. Input images may include textual information, either on its own or in combination with other types of images.

The invention requires a series of input images to be specially manipulated and altered. Each input image is fractured into segments of the size and shape of the image that can be viewed through a single aperture of the mask. These segments are called fractions. These fractions are placed inside of output frames. In the preferred embodiment, each output frame is the same size as the input frame. To animate the input images in a left to right fashion, the fractions should be redistributed as follows: the first fraction of the first input image is placed in the first position of the first output frame; the second fraction of the first input image is placed in the second position of the second output frame; the third fraction of the first input image is placed in the third position of the third output frame; and this process continues until there are no more fractions. Then, the first fraction of the second input image is placed in the first position of the second output frame; the second fraction of the second input image is placed in the second position of the third output frame; and once again, this process continues until there are no more fractions. This process of placing fractions of the input frames continues until there are no more input images.

Figure 3:
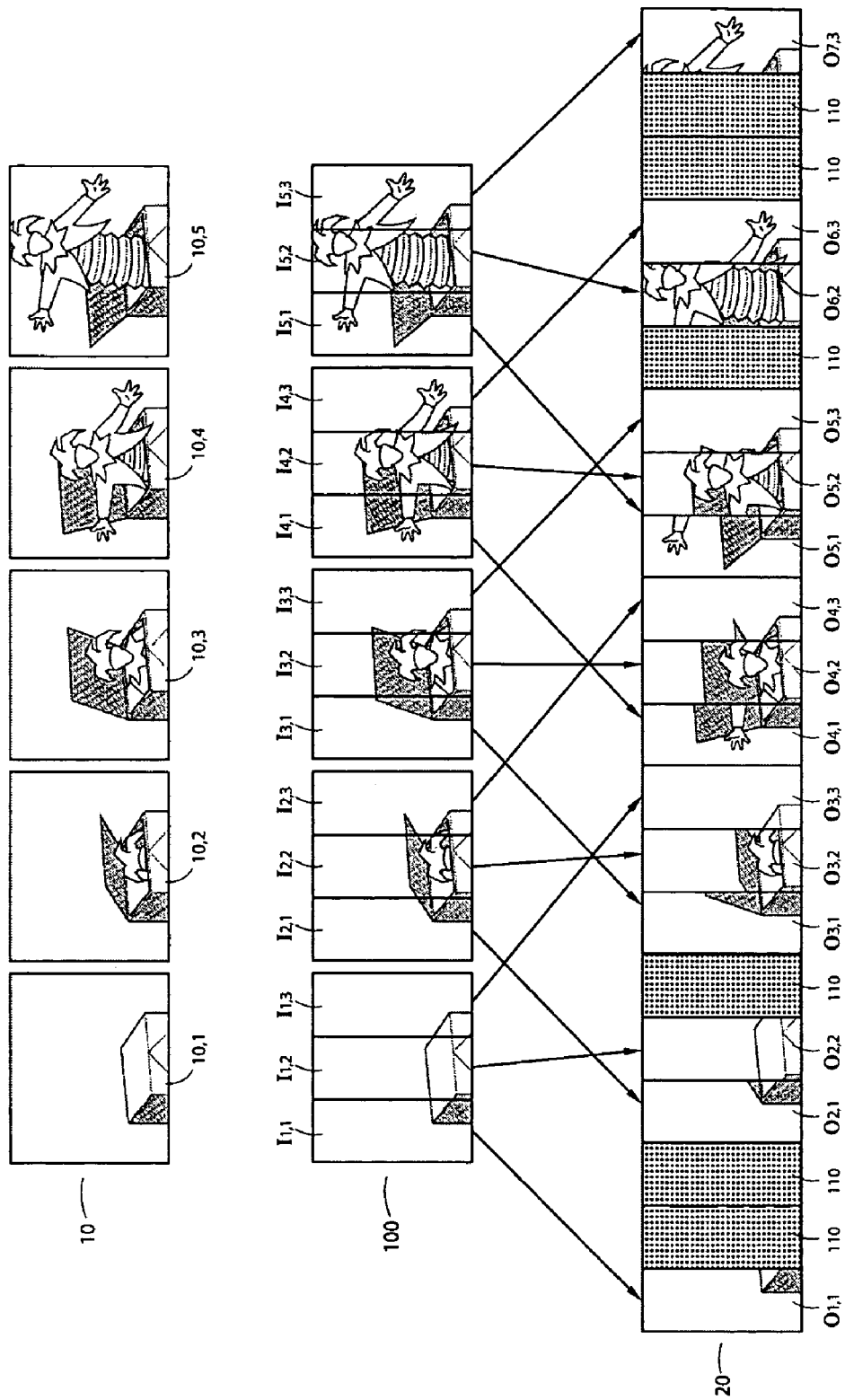
FIG. 3 is a schematic plan view of a sequence of images that are fractured then distributed.

FIG. 3 shows the redistribution of the fractions 100 of a series of input images 10. The formula for determining where each fraction is placed onto output frame 20 when the movement is left to right from the user's perspective is as follows:

$O_{n,m}$=Output Frame n, fraction m $I_{x,y}$=Input Image x, fraction y $$O_{(x+y-1),y}=I_{x,y}$$

The formula for determining where each fraction is placed when the movement is right to left from the user's perspective is as follows:

Q=Number of Input Images

R=Number of fractions $$O_{(Q-x+y),y}=I_{x,y}$$

The above formulas relate to where fractions are placed in a vertical orientation. This is an optimal situation when the relative movement is horizontal. However the apertures (and therefore the fractions) can be on any angle and are not restricted to straight lines.

In examining FIG. 3 once again, left to right horizontal movement with a vertical mask would result in fractions 100 being redistributed as follows:

$I_{1,1} \rightarrow O_{1,1}$ $I_{1,2} \rightarrow O_{2,2}$ $I_{1,3} \rightarrow O_{3,3}$ $I_{2,1} \rightarrow O_{2,1}$ $I_{2,2} \rightarrow O_{3,2}$ $I_{2,3} \rightarrow O_{4,3}$ $I_{3,1} \rightarrow O_{3,1}$ $I_{3,2} \rightarrow O_{4,2}$ $I_{3,3} \rightarrow O_{5,3}$ $I_{4,1} \rightarrow O_{4,1}$ $I_{4,2} \rightarrow O_{5,2}$ $I_{4,3} \rightarrow O_{6,3}$ $I_{5,1} \rightarrow O_{5,1}$ $I_{5,2} \rightarrow O_{6,2}$ $I_{5,3} \rightarrow O_{7,3}$ By examining the formulas above and FIG. 3, it will become apparent that the number of output frames is always greater than the number of input images. Therefore the combined surface area of the output frames is greater than the combined surface area of the input images.

Once again, examining the formulas above, it is apparent that there are some fractions in output frames that have no corresponding fractions imported from input images. This is identified in FIG. 3 as negative space 110. An embodiment can fill these negative space fractions with a solid color. Another embodiment would take fractions from the first and last of the series of input images and simply repeat them in the corresponding positions in the output frames where there are no input fractions. This creates a "freeze frame" leading into and out of the animation.

Whereas it might seem as if it is impossible to see a whole image through a mask in this fashion, the viewer will perceive a substantially whole image. This is a result of the "Phi phenomenon". The Phi phenomenon is a result of human instinct. The human brain strives to make meaning from what it perceives. Even though the mask creates gaps between the visible parts of the image, the Phi phenomenon explains the fact that the viewer's brain recreates the whole image to make sense from what it sees. Despite the mask, the viewer is still able to perceive what was intended.

"Persistence of vision" is another phenomenon that comes into play with the invention. It allows for the illusion of the mask disappearing altogether. With persistence of vision, the brain retains an image for a brief amount of time after seeing it. For example a motion picture projector projects an image approximately 24 times a second with gaps in between each image. However, to the moviegoer, there is smooth animation. An image is held for a brief moment to cover the gap until the next image appears. With the invention, when there is relative movement, the brain holds the image until the following image "fills in the gap" for the viewer. Consequently the mask perceptively disappears.

Figure 4A:
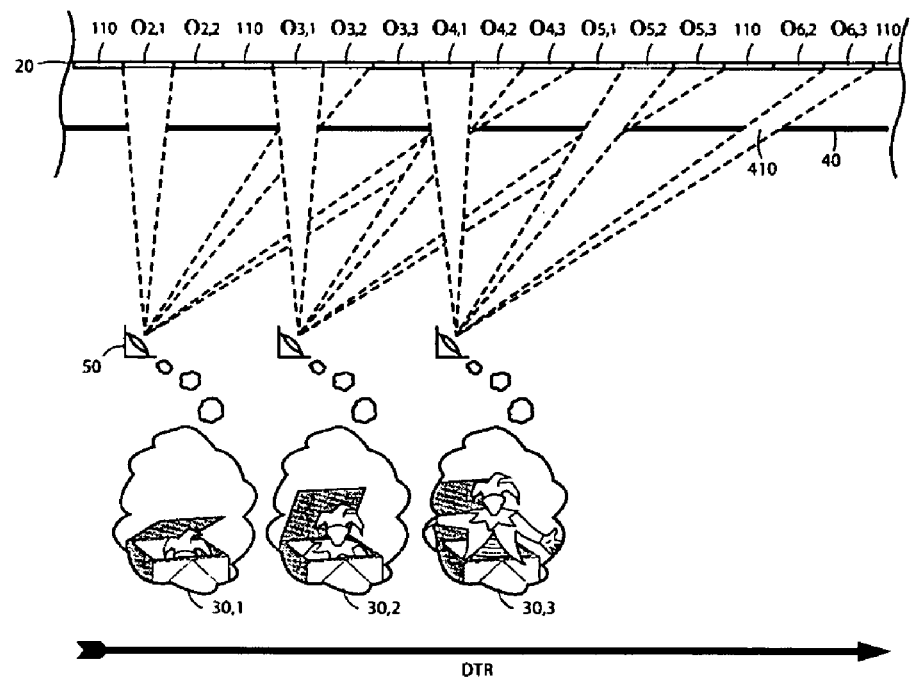
FIG. 4a) is a schematic top view of a sequence of fractured images for viewing through a mask creating an animation.

A note regarding FIGS. 4a) through to 7b): the widths of the depicted images and masks are exaggerated in order to present clearer visualizations of how the invention works. In practice, those widths would be substantially smaller.

In FIG. 4a) the viewer's 50 direction of travel is from left to right DTR. As the viewer moves, the angle of views remain the same, but the perceived image 30 changes due to the invention presenting different images as fractioned above. This figure assumes horizontal perpendicular movement left to right and a vertical mask.

Figure 4B:
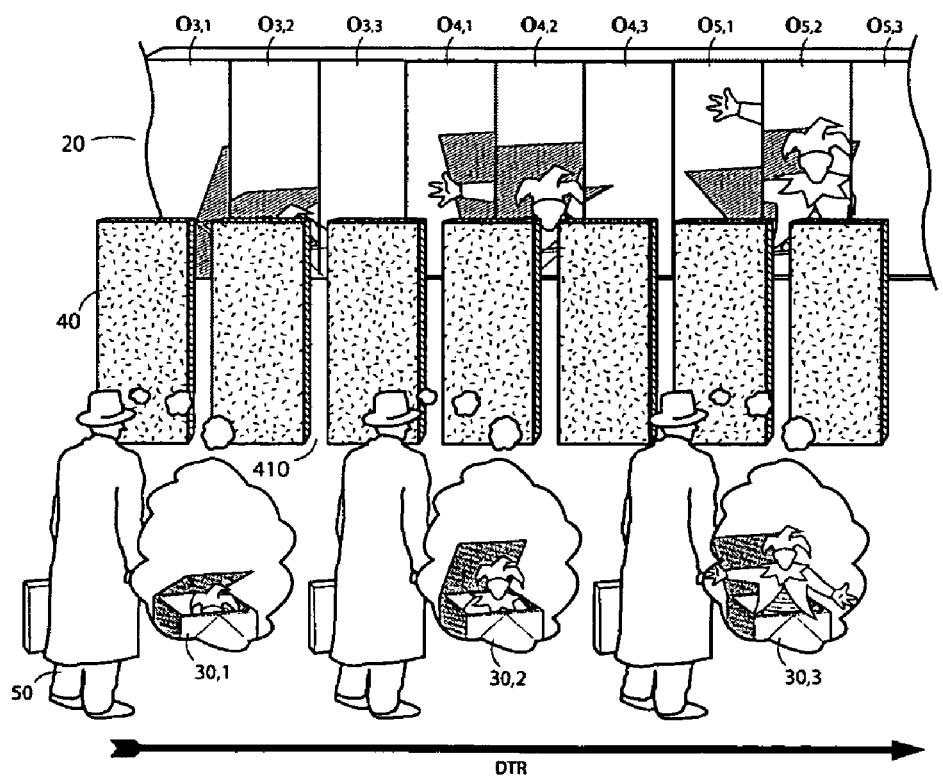
FIG. 4b) is a perspective view of a sequence of fractured images for viewing through a mask creating an animation.

FIG. 4b) is a front view similar to FIG. 4a). The viewer 50 moves from left to right and perceives a different image 30 in each position. A progression of such images creates animation.

It is possible to adjust where the perceived image appears to the viewer. For example, it might be useful to have the perceived image appear just ahead of viewer instead of at a perpendicular 90 degree angle to the viewer's direction of travel. FIG. 4a) shows how the viewer 50 is not looking directly at the invention. The angle of view is slightly ahead of the movement.

The way to adjust the position of the perceived image is to vary the relative placement of the mask and of the output image in relation to one another. If the centers of the apertures in the mask line up with the centers of the output frame, the perceived image will appear perpendicular to the viewer. By adjusting one of the centers slightly forward the perceived image will shift and appear in front of the viewer. By adjusting one of the centers slightly backwards, the perceived image will shift and appear behind the viewer.

It is important to know where the placement of the perceived image will be if any of the field of vision masking techniques described above are to be applied. When the viewer looks at the perceived images in the invention, it is possible that the viewer will see more than one perceived image at the same time. Such multiple simultaneously perceived images occur because the width of the viewer's field of vision may be greater than the width of a single perceived image. All multiple perceived images animate simultaneously when there is relative motion and each perceived image represents a different time period in the animation.

Figure 5:
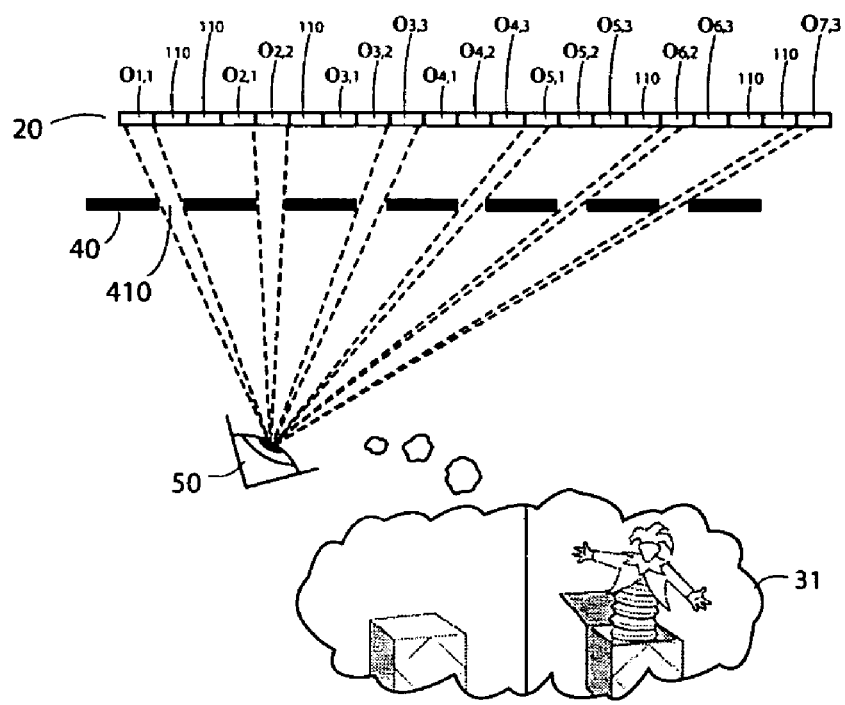
FIG. 5 is a schematic top view of a sequence of fractured images for viewing through a flat mask creating two reformed images.

FIG. 5 demonstrates how the viewer 50 has a field of vision greater than that of one perceived image. Therefore the perceived image 31 includes more than one image simultaneously.

An alternative embodiment is to restrict the viewer's line of sight to less of the output image. Consequently the viewer's attention will not be distracted by the plurality of perceived images. This embodiment uses baffles such as masking bars or triangles or any other such shape having a dimension perpendicular to the mask to block the viewer's line of sight to the output image in order to only reveal the images intended to be displayed.

Figure 6:
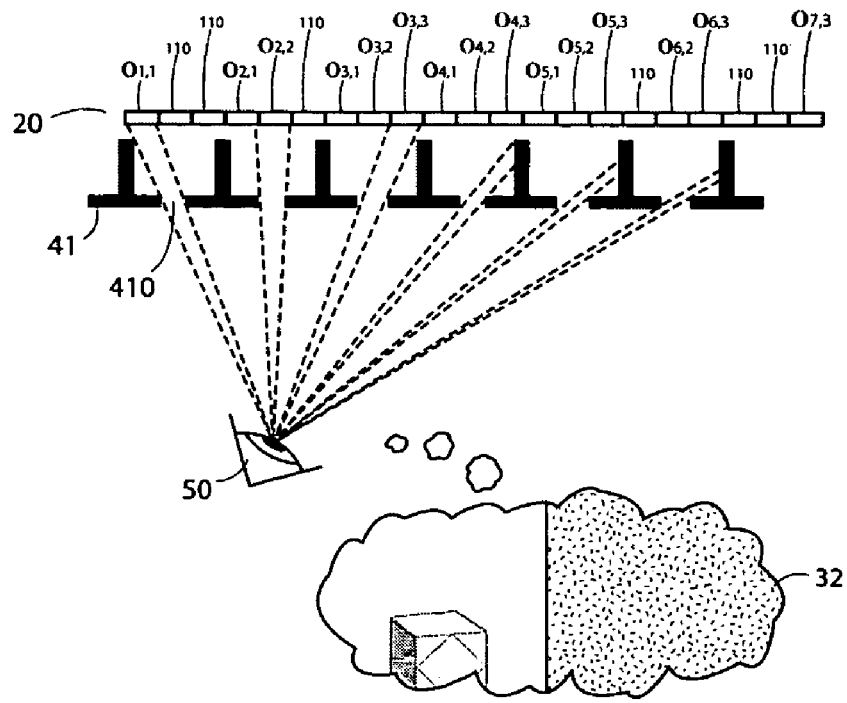
FIG. 6 is a schematic top view of a sequence of fractured images for viewing through a non-flat mask creating one reformed image and one blocked image.

FIG. 6 demonstrates how the viewer 50 perceives only one image 32 due to the field of vision being blocked by "T" shaped baffles 41.

Another embodiment is to place the sequence of output frames onto a semi-circular or arc-shaped backing. The shape of the backing limits the viewer's line of sight restricting the view of output images other than the ones intended to be displayed.

The invention also works when relative movement is in both directions of the axis of motion, therefore creating a bidirectional invention. If the input images are fractured in a left to right arrangement, the viewer observing the invention when the relative direction is right to left will see animation in reverse. When the direction of movement is unknown, animation that works in both directions is advised. For example, animation that is depicting motion that is highly directional (for example, a profile of a cyclist in motion) is not advised should the viewers' directions of travel to the invention be both directions. However, animation that is depicting, for example, a rotating product would work well in situations where the direction of motion (on the axis appropriate for the apertures) is unconstrained.

It is possible to adjust the invention to display animation in one direction only, whereby the viewer traveling from one direction perceives animation while the viewer traveling from the opposite direction perceives no animation, therefore creating a unidirectional invention. This is achieved by adjusting either the shape of the mask or of the output image itself. The purpose of these alternative embodiments is to restrict the field of vision of the viewer. This is similar to the statements above in regards to reducing the number of perceived images. However the intent is different.

Figure 7A:
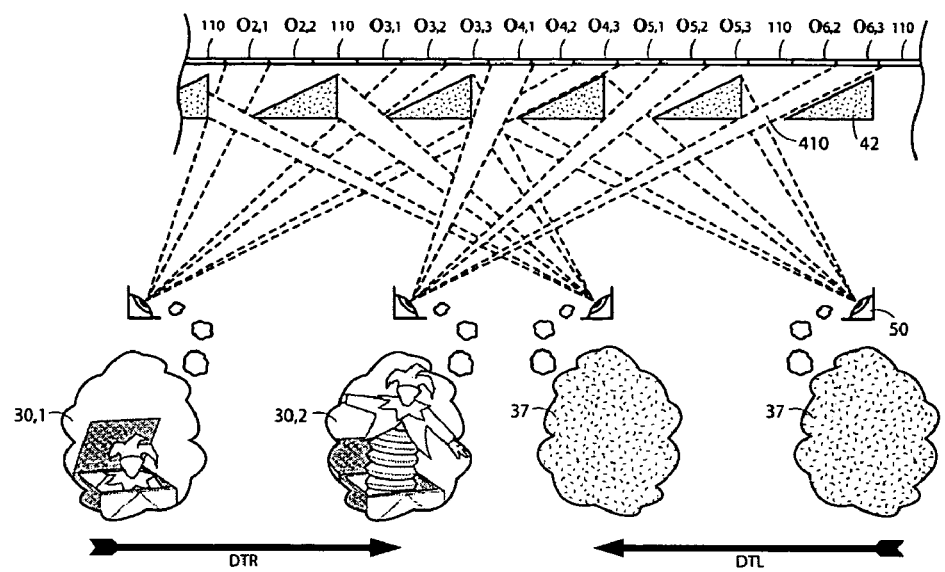
FIG. 7a) is a schematic top view of a sequence of fractured images for viewing through a non-flat mask creating an animation in one direction and blocked animation from the opposite direction.

FIG. 7a) shows an alternative embodiment for the mask. By using a triangular masks 42 with angles calculated as a result of the perceived image size and of the direction of viewing, any angle upon which the viewer views the output image that is not intended is blocked. Therefore when the viewer is moving in the opposite direction, there is no image or animation perceived. An alternative to using triangles is to use masking flat bars at a predetermined angle to block the viewer's view at angles outside the scope of what is intended.

Figure 7B:
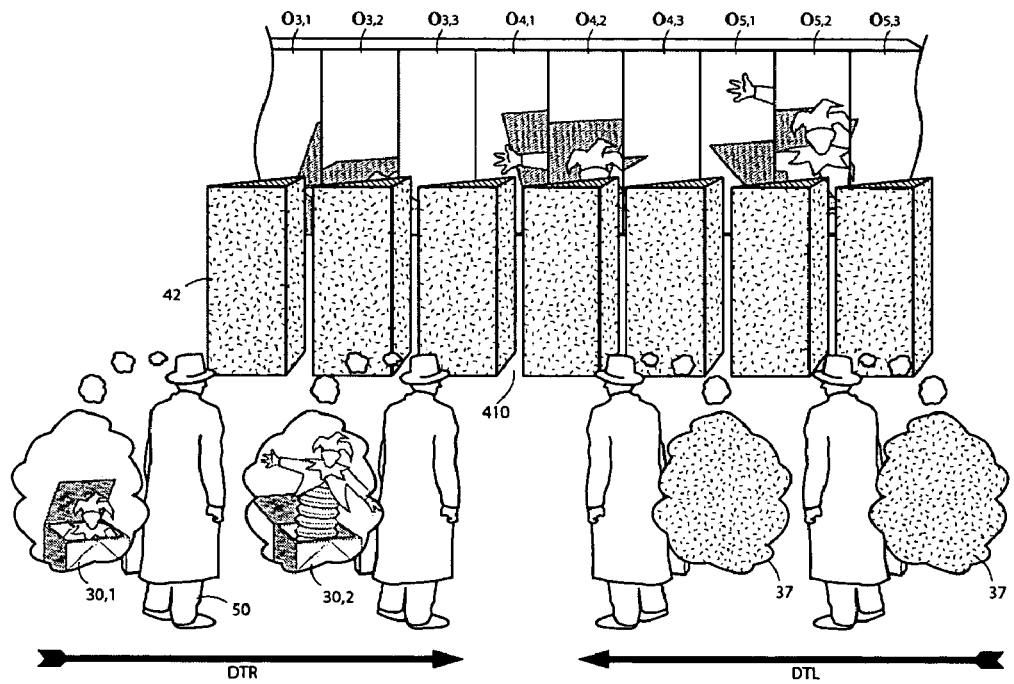
FIG. 7b) is a perspective schematic view of a sequence of fractured images for viewing through a non-flat mask creating an animation in one direction and blocked animation from the opposite direction.

FIG. 7a) is a top view showing an embodiment where the field of vision is restricted using triangular masks 42. A viewer 50 observing the invention from left to right direction of travel DTR is given a clear view and therefore perceives images 30 creating animation. A person moving in a relative motion in the opposite direction (right to left direction of travel DTL) perceives no image 37 and no animation. FIG. 7b) is a front view of FIG. 7a).

An alternative embodiment is to use two masks. These masks run parallel to each other. The viewer is now seeing the output image through two masks. The mask facing the viewer is as previously described. The second mask, located behind the first mask and ahead of the output image, is substantially similar to the first mask except that the apertures have greater width. The centers of the apertures of the two masks can be offset to adjust the viewing angle and therefore create a unidirectional invention.

Examples of variations to the mask are, but not limited to: flat shapes mounted on the side of the mask facing the viewer; flat shapes mounted on the side of the mask away from the viewer; flat shapes mounted to the output image; triangular shaped objects mounted on the mask facing the viewer; triangular shaped objects mounted on the mask away from the viewer. The angles of the triangles can be adjusted for the appropriate effect. Another alternative is to vary the thickness of the mask. The apertures in a thick mask can be cut to angles other than right angles to adjust the angle of viewing.

Figure 8:
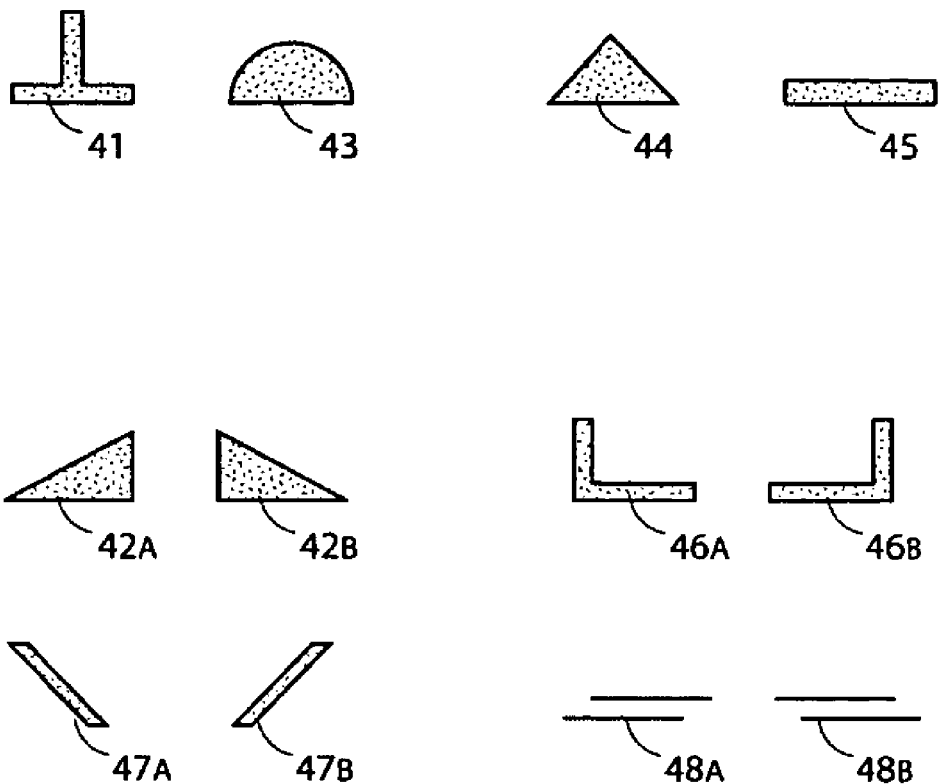
FIG. 8 is a cross-sectional view of examples of alternative masks.

FIG. 8 shows various embodiments of masks. Bidirectional mask shapes include, but are not limited to: upside down "T's" 41; semi-circles 43; triangles 44; thick masks 45. Unidirectional baffle shapes include, but are not limited to: right triangles 42A or left triangles 42B; "L's" 46A or reversed "L's" 46B; left angles 47A or right angles 47B; parallel masks offset to the left 48A or offset right 48B.

Adjustments can also be made to the output image to create directionality of viewing. By putting each output frame on an angled backing or surface, the line of sight of the viewer can be restricted therefore creating a unidirectional invention. Angled backings may be, but not limited to, a series of semi circles or a series of triangles.

In a preferred embodiment, the entire width of a single input image in the animation should fit in the width of the output frame. The width of one output frame equals the combined width of one opaque plus one aperture of the mask. The choice is to either adjust the mask so that the output frame matches the input image width or to change the width of the input image to match the output frame. This can be done photographically, digitally or with any other image manipulation method.

Alternative embodiments may have the width of the output frame vary from the width as dictated by the mask. The result of making the size of the output frame smaller is that the perceived image will not track perfectly or keep in perfect sync with the viewer in motion. When the size of the output frame is exactly that dictated by the mask, the perceived image remains at the same angle to the viewer therefore corresponding with the viewer's-motion. When the size of the output frame is smaller, the perceived image falls behind the viewer in motion. When the size of the output frame is greater, the perceived image moves ahead of the viewer in motion.

There is a natural tendency for the perceived image to appear magnified on an axis perpendicular to the direction of the apertures of the mask. The further the viewer is from the invention, the wider the perceived image appears. Specifically, when the viewer is at a distance two times from a known position, the perceived image will appear two times greater on the axis perpendicular to the direction of the predominance of the apertures in the mask.

The reason for this expansion of the perceived image relates to the number of apertures that is visible to the viewer. When the viewer moves to a greater distance away from the apparatus, the angles remain the same, however the distance between the leftmost and rightmost fractions is much greater thereby appearing to stretch the perceived image in the horizontal dimension only.

It is possible to adjust the apparent width of the perceived image by adjusting the distance between the mask and the output image. By moving the mask closer to the output image, the perceived image will appear larger on the axis perpendicular to the predominant direction of the mask when the viewer remains at the same distance from the invention. When the distance between the mask and output image is increased, the perceived image appears smaller when the viewer remains at the same distance from the apparatus. The size of the perceived image on the axis of the predominant direction of the mask remains constant no matter what distance there is between the mask and the output image and between the viewer and the apparatus.

A formula for determining the ideal distance of the viewer from the apparatus is as follows:

$D_v$=Distance of the viewer from the apparatus
$D_p$=Dimension of the perceived image in the direction perpendicular to the mask
$D_o$=Dimension of the output frame
$D_m$=Dimension of the separation between the mask and the output image $$D_v = \frac{D_p}{D_o} \times D_m$$

For example, if the width of the perceived image appears correct at a viewer's distance of 10 feet from the apparatus when the distance from the output image to the mask is two inches, by decreasing the distance from the output image to the mask to one inch, the perceived image width will double in size on the axis perpendicular to the apertures in the mask.

Altering the output frame sizes as described earlier also affects the perceived width of the animation. When the output frame is smaller than the size dictated by the mask, the perceived image appears smaller in the direction perpendicular to the predominant direction of the mask. When the output frame is larger than the size dictated by the mask, the perceived image appears larger in the direction perpendicular to the predominant direction of the mask.

As a result of this expansion in the perceived image, it is important to determine the optimal distance the viewer will be from the invention. This distance will result in the magnification factor. Using the magnification factor, the correct aspect ratio (the horizontal width and the vertical height) should be matched to the input aspect ratio by altering the output image in the same direction as the mask. Most often the height is expanded to adjust the aspect ratio size so that it matches the aspect ratio size of the original image input.

The formula for determining the dimension of the output image in the predominant direction of the mask is:

$D_d$=dimension of the perceived image in the direction of the mask
$D_p$=dimension of the perceived image in the direction perpendicular to the mask
$I_d$=dimension of the original input images in direction of the mask
$I_p$=dimension of the original input images in the direction perpendicular to the mask $$D_d = \frac{D_p \times I_d}{I_p}$$

For example, if the input images are 24 inches wide and 18 inches high and at the distance the viewer is from the invention, the viewer perceives an output image that is 48 inches wide, therefore the height should be magnified to 36 inches. This is assuming horizontal movement and apertures running vertically.

Another factor that should be adjusted, once knowing the optimal distance of the viewer from the invention, is the number of fractions to fracture the input images.

To determine the number of fractions an input image needs to be fractured into, the dimension of the perceived image in the direction perpendicular to the mask should first be determined. Then one should calculate the number of mask apertures that are contained in that distance should be calculated. These factors will result in the number of fractions the input images need to be fractured into.

The formula for determining the number of fractions is as follows:

F=Number of fractions an input image needs to be fractured into $D_p$=Dimension of the perceived image in the direction perpendicular to the mask A=The number of apertures per unit of measure used $D_p$ $$F = D_p \times A$$

For example, the perceived image is to be displayed 36 inches wide by 24 inches high, and the mask has 10 apertures per linear foot. According to the above formula, in this example Dp is 3 feet and A is 10/foot, the result for F is 30 fractions. Once again this is assuming horizontal movement and vertical apertures.

If the input image is fractured in a number of fractions that does not match what the formula above determines, then one side of the image the viewer perceives will come from one input image and another side of the perceived image will come from another input image. If the two sides of the perceived image come from input images that are not sequential, the intervening parts will come from intervening input images from the input sequence. The result of this is perceived images that are incongruent.

Animation typically has a frame rate. For example, typical NTSC video shows images at the rate of 30 frames per second. The invention will work with all of the standard frame rates that exist.

To determine the perceived frame rate of animation of the invention, the number of apertures that a viewer passes by as a result of relative motion should be determined. For example, if there are 10 apertures per linear foot and the viewer's relative motion is three feet per second, the resulting perceived frame rate is 30 frames per second. By adjusting the size of the frames of the mask (and of the output image) thereby changing the number of apertures per linear foot, or by adjusting the rate of the viewer's relative motion, the frame rate can be controlled.

An alternative method of decreasing the perceived frame rate is to multiply the input images. By duplicating the input images (doubling each input image), the perceived frame rate would slow down to half speed. By tripling the input images, the perceived frame rate would slow down to one-third speed.

Figure 9:
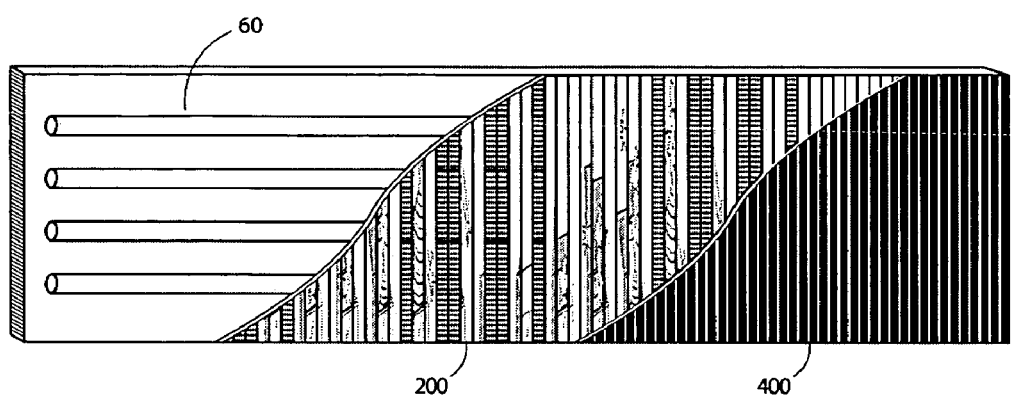
FIG. 9 is a cross-sectional view of an example of an embodiment of an apparatus to display fractured images through a mask.

An example of an apparatus embodiment for the invention is shown in FIG. 9.

The front mask 400 includes opaque sections interspersed with clear apertures. The masks may be manufactured utilizing any suitable manner, including: applying the opaque sections directly onto the front or the back of a transparent material (such as glass or plastic); applying opaque sections onto a substrate which can then be mounted onto the front or the back of a transparent material or mounted in between two layers of clear material; vertical strips of opaque materials such as metal. The opaque sections may be applied by printing, photographic processes, silk-screening, painting, etching, or other suitable means.

The output image 200 may comprise of printed or photographically applied images on a substrate, such as used in typical rear-light signs.

The light source 60 shows fluorescent tubes, but may include any type of artificial light source available, and may be positioned behind, in front, or anywhere around the output image.

Figure 10:
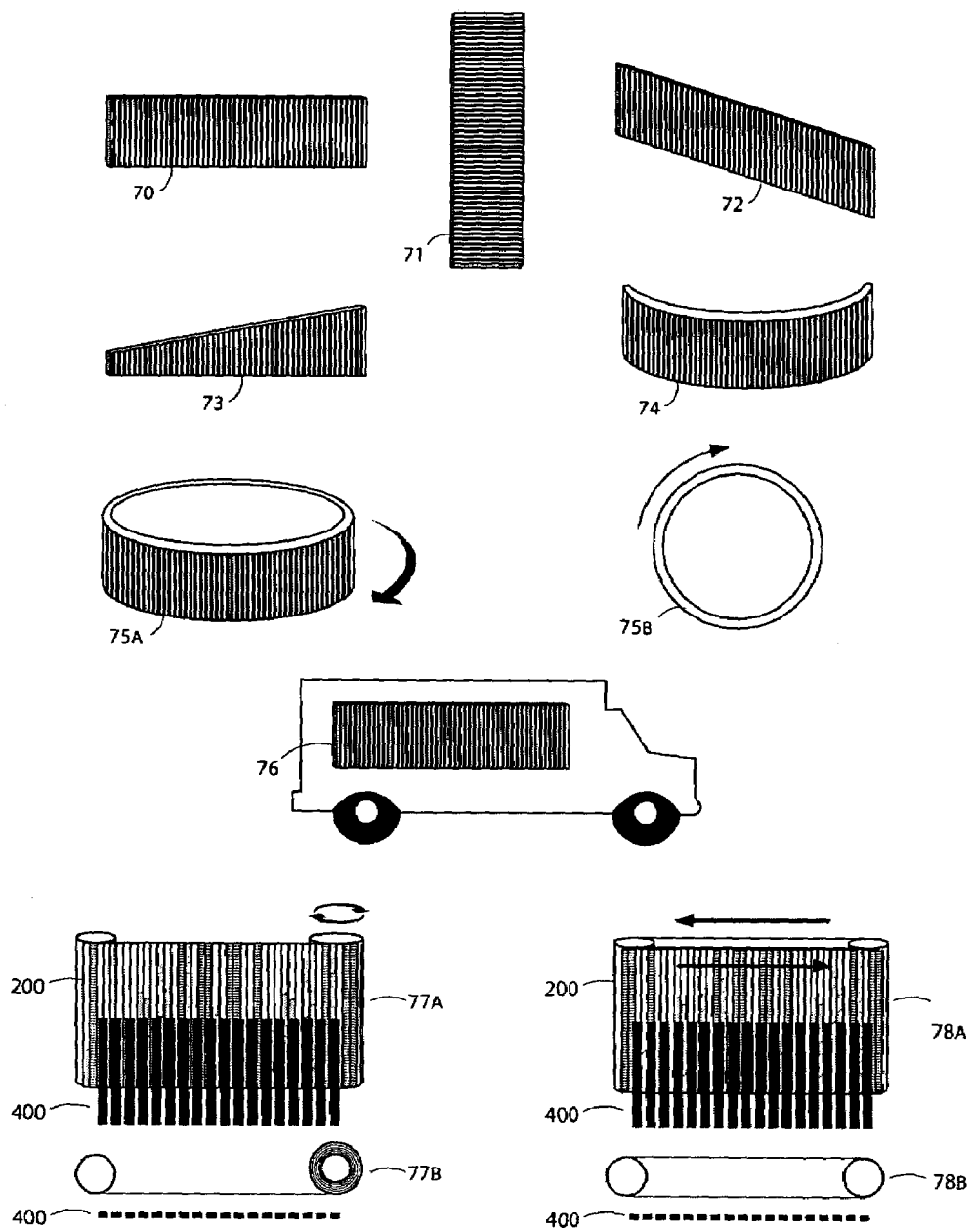
FIG. 10 shows various front views, perspective views and cross-sectional views of examples of alternative embodiments of apparatus.

Alternative shapes of apparatus embodiments of the invention are shown in FIG. 10. Examples of shapes shown are: horizontal 70, vertical 71, diagonal 72, triangular 73, arched or curved 74, but other forms are possible. There are no limitations as to the widths or heights of these apparatus embodiments.

An alternative embodiment is a circular apparatus 75A and 75B which may rotate and therefore allowing the viewer to be stationary while perceiving animation. Another example which permits the viewer to be stationary while perceiving animation is by mounting the apparatus onto any type of moving vehicle such as, but not limited to, a truck 76.

An alternative embodiment is applying a second order of static images onto the front surface of the opaque sections of the mask.

In an alternative embodiment, the output image can be combined with other output images and mounted onto a substrate that is then placed on a roller type apparatus 77A (top view 77B). Consequently the substrate 200 (hence the output images) can be changed via a cranking mechanism or motor, and possibly controlled by a remote control or a timer.

One advantage of the invention is that an image can be perceived when there is no relative motion between the viewer and the invention. This improves upon prior art that requires motion in order for an image to be perceived).

A further embodiment 78A (top view 78B) is to place the output image onto a continuous substrate 200, then by having the substrate (hence the output image) moving at a constant speed, the animation is perceived by the viewer through mask 400 without the need for relative motion between the viewer and the invention.

Some applications for the above apparatus embodiments may be for advertising, entertainment, or to provide information.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A process for treating a plurality of still images for use in providing an animated display comprising:
   providing a plurality of source image frames, wherein each frame has an x-axis and a y-axis;
   fracturing of each said source image frames along said x-axis to provide a plurality of image fractions of a predetermined dimension; and distributing said image fractions of each source image frame in a predetermined sequence along the x-axis to provide an output image;

wherein said image fractions are placed in a vertical orientation in sequence along a horizontal axis and the placement of said image fractions to provide an output image is determined by the formula:

$$O_{(x+y-1),y} = I_{x,y}$$

where $O_{n,m}$=output frame n, fraction m, and $I_{x,y}$=input image x, fraction y.

2. A process for treating a plurality of still images for use in providing an animated display comprising:

providing a plurality of source image frames, wherein each frame has an x-axis and a y-axis;

fracturing of each said source image frames along said x-axis to provide a plurality of image fractions of a predetermined dimension;

distributing said image fractions of each source image frame in a predetermined sequence along the x-axis to provide an output image; and wherein the plurality of image fractions are of equal dimension, and the number of said fractions is determined by the formula:

$$F = D_p \times A$$

where F is the number of image fractions optimally required, $D_p$ is the dimension of a perceived output image, and A is the number of transparent members per unit of measure used for $D_p$.

\* \* \* \* \*